United States Patent
Metzger

(10) Patent No.: US 7,600,958 B2
(45) Date of Patent: Oct. 13, 2009

(54) THREADED RING

(75) Inventor: Heinz Metzger, Kirchheim (DE)

(73) Assignee: Speith-Maschinenelemente GmbH & Co. KG, Esslingen (DE)

( * ) Notice: Subject to any disclaimer, the term of this patent is extended or adjusted under 35 U.S.C. 154(b) by 484 days.

(21) Appl. No.: 10/562,159

(22) PCT Filed: Sep. 7, 2004

(86) PCT No.: PCT/EP2004/009943

§ 371 (c)(1),
(2), (4) Date: Dec. 23, 2005

(87) PCT Pub. No.: WO2005/073570

PCT Pub. Date: Aug. 11, 2005

(65) Prior Publication Data

US 2006/0165509 A1    Jul. 27, 2006

(30) Foreign Application Priority Data

Jan. 22, 2004   (DE) .................... 10 2004 003 183

(51) Int. Cl.
*F16B 39/02* (2006.01)
(52) U.S. Cl. .................. 411/286; 711/288; 711/290
(58) Field of Classification Search .......... 711/285–291
See application file for complete search history.

(56) References Cited

U.S. PATENT DOCUMENTS

| | | | | |
|---|---|---|---|---|
| 171,898 A | * | 1/1876 | Wiles .................... | 411/286 |
| 518,474 A | * | 4/1894 | Wallace ................ | 411/230 |
| 2,409,204 A | * | 10/1946 | Gall .................... | 188/74 |
| 3,667,525 A | * | 6/1972 | Spieth .................. | 411/292 |
| 4,043,692 A | * | 8/1977 | Hund ................... | 403/373 |
| 5,197,809 A | * | 3/1993 | Chi ..................... | 384/617 |
| 5,472,245 A | * | 12/1995 | Meske et al. ........... | 285/414 |
| 5,609,456 A | * | 3/1997 | Joki .................... | 411/433 |
| 5,662,445 A | * | 9/1997 | Harbottle et al. ....... | 411/433 |
| 5,907,983 A | * | 6/1999 | Spirer ................. | 81/53.2 |
| 6,851,905 B2 | * | 2/2005 | Manfred ................ | 411/286 |
| 7,182,564 B2 | * | 2/2007 | Metzger ................ | 411/286 |

FOREIGN PATENT DOCUMENTS

| | | |
|---|---|---|
| DE | 1 675 685 | 1/1970 |
| DE | 102 52 780 A1 | 5/2004 |
| EP | 0 794 338 A1 | 9/1997 |
| EP | 0 965 768 A1 | 12/1999 |
| GB | 280 273 A | 11/1927 |

* cited by examiner

*Primary Examiner*—Victor Batson
*Assistant Examiner*—David C Reese
(74) *Attorney, Agent, or Firm*—Roylance, Abrams, Berdo & Goodman, L.L.P.

(57) ABSTRACT

A threaded ring has a single-component body provided with an internal screw thread (14, 16) and two body parts (10, 12). The first part (10) forms an adjusting ring having an end face (22) located on a radial plane. The second body part (12) forms a security ring connected to the first body part (10) by an elastically flexible wall part (32) of the body, forming a gap (26) between the two body parts. An actuating device can adjust the geometry of the gap (26) due to the elastic flexibility of the wall element (29) along the longitudinal axis of the body. A bearing surface (46) having a predefinable inclination is arranged in the premounting state between parts of the actuating device and parts of the body.

14 Claims, 3 Drawing Sheets

THREADED RING

FIELD OF THE INVENTION

The present invention relates to a threaded ring having a one-piece body provided with internal threading and at least two body components. The first body component is in the form of a set collar with an end plane surface in a radial plane. The second body component forms a retaining ring connected to the first body component to form a gap positioned between the two body components by an elastically flexible wall component of the body. An actuating mechanism adjusts the geometry of the gap due to the elastic flexibility of the wall component along the longitudinal axis of the body.

BACKGROUND OF THE INVENTION

Threaded rings of this type are disclosed in DE Patent Application 1 675 685, for example, are commercially available and are applied in various areas of mechanical engineering. The body component forming the plane surface serves as a high-precision nut seated on the external threading of a shaft or spindle. The nut axial position along the longitudinal axis of the threaded ring can be determined with high accuracy by the second body component used as the retaining ring. The threaded flank clearance present between external threading and internal threading is eliminated in that the width of the gap between the two body components is modified by the actuating mechanism. Such modification is made possible by the elastic flexibility of the wall component forming the body components.

The actuating mechanism can be set screws permitting reciprocal tightening of the set collar and the retaining ring. The set collar may function as an adjusting nut with a plane surface forming a contact surface for positioning of roller bearings on shafts, or can be used as a precisely positioned shaft collar or the like.

In the described threaded ring, the gap between the body components is formed by two gap segments offset from each other in the axial direction. One segment extends from the threaded bore to the vicinity of the circumference of the threaded ring. The other segment extends radially inward from the circumferential surface to the vicinity of the threaded bore. Between the two gap segments, an elastically flexible wall component connects the two body components and has a wall thickness selected such that this wall component is elastically flexible. The geometry of the gap may then be adjusted by the set screws serving as an actuating mechanism. The threaded flank clearance is eliminated. The locking effect desired is achieved by tensioning the two body components. The relatively high production cost is a disadvantage of this threaded ring.

EP 0 956 768 A1 discloses another generic threaded ring made as a precision tensioning nut. This precision tensioning nut has a solid nut block having an internal threading, an end face machined flat and aligned at a right angle to the axis of the thread, and a circumferential surface. Individual clamping elements each form a radially extending segmented sector from a part of the nut block. The clamping elements, for the purpose of axial locking by a clamping screw operable parallel with the axis, may be elastically inclined. The clamping elements moreover form at most 50% of the component such that in axial locking on the tensioning side at most 50% of the circumference of the thread in the form originally produced is changed. Distortion of the plane surface and loosening by insufficient locking are thus avoided. This solution compared to the initially mentioned solution in the prior art has only one open gap segment and not two. The gap segment is also closed to the outside so that no foreign substances are able to penetrate from the outside into the gap area. The production effort and the costs are thus reduced accordingly. Only the production of the segmented clamping element is in turn associated with increased production effort. Achieving a uniform application of the clamping force is likewise made difficult as a result of the segmented configuration of the clamping elements.

DE-A-102 52 780 A1 (corresponding to U.S. Pat. No. 7,182,564) discloses another threaded ring. A second body component used as the retaining ring forms an elastically flexible wall component having a circumferential area which, compared to the first body component, is reduced to an outside diameter situated over a smaller radius than the end of the gap situated radially to the outside. The circumferential area of the second body component which has been reduced in diameter ends at an axial distance from the gap defining the extension of the flexible wall component in the axial direction.

Instead of the complex production of two gap sections, in this disclosed solution with the formation of the flexible wall component, only the configuration of an integral gap as an internal recess and the external machining of the second body component are necessary to reduce its outside diameter in areas. This reduction can be effected by simple machining.

Furthermore, in the disclosed solutions, after fixing the set collar on the assignable threaded piece and after subsequent tightening of the retaining ring, plastic deformations may unintentionally occur along the threadings. This deformation leads to the threaded ring becoming unusable. The threaded ring then possibly can no longer be removed from the clamping thread. Basically, this problem can be prevented by torque wrenches with a definable locking torque. In practical applications for the threaded ring, however, often in the absence of a suitable torque wrench, this measure is ignored and the threaded ring is fixed with conventional tools.

SUMMARY OF THE INVENTION

An object of the present invention is to provide an improved threaded ring while maintaining the advantages of the conventional threaded rings, that is simple and economical to produce, so that at a reduced size high efficiency can still be achieved. By tensioning the two body components, the threaded flank clearance is effectively eliminated to achieve the desired locking action.

This object is basically achieved by a threaded ring having a preinstallation state where a contact surface is between the components of the actuating mechanism and the components of the body. The contact surface is provided with a definable inclination. The angle of inclination relative to the longitudinal axis of the body is selected such that in the installed state the occurrence of threaded flank clearance is eliminated. In the installed state, the clamping force of the actuating mechanism then takes effect on the inside circumference near the threaded flanks which are to be clamped. As a result of the favorable distances between the external radial end of the gap, of the application of force of the actuating mechanism by the inclined contact surface and of the threaded flanks to be clamped, high efficiency is achieved. That is, the threaded flank clearance is effectively eliminated to obtain an adequate locking effect. The threaded ring of the present invention can be easily and economically produced, and requires only little installation space since there need not be two gap segments, but only one, and since making the two body components different with respect to their circumferential area can also be omitted.

An additional advantage is that there is no gap segment open to the outside on the threaded ring. The threaded ring of the present invention has a closed circumferential contour to avoid the danger during operation of foreign substances settling in the gap area. Such would occur if the circumference is open. For example, contaminants, wear particles, shavings or the like, contained in the lubricants, could lead to the formation of an unbalancing mass on the circumference of the threaded ring. Based on the sleeve-like configuration, uniform application of force with the threaded ring is achieved, as is a high level of locking of the threaded ring at the installation site.

The inclined positioning of the retaining ring before the defined fixing position of the threaded ring on the respective thread ensures that the set collar can be fixed in a defined manner. When the retaining ring is subsequently tightened, only the threaded flank clearance is overcome before the application of the locking force by the retaining ring to the set collar takes place. As a result of this measure, plastic deformations in the clamping process between the threads can for the most part be prevented. Even in an improper clamping process, the threaded ring then maintains its function and can also be easily removed again from the respective thread.

In one preferred embodiment of the threaded ring of the present invention, the actuating mechanism has tensioning means which, to the extent they are countersunk into respective recesses of the retaining ring in the installed state, form with their tightening contact surfaces to the front face of the retaining ring a clamping angle corresponding to the angle of inclination in the preinstallation state. This arrangement yields the possibility of visual checking for a successfully completed clamping process using the clamping angle.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure and which are schematic and not to scale.

DETAILED DESCRIPTION OF THE INVENTION

Figure 1:
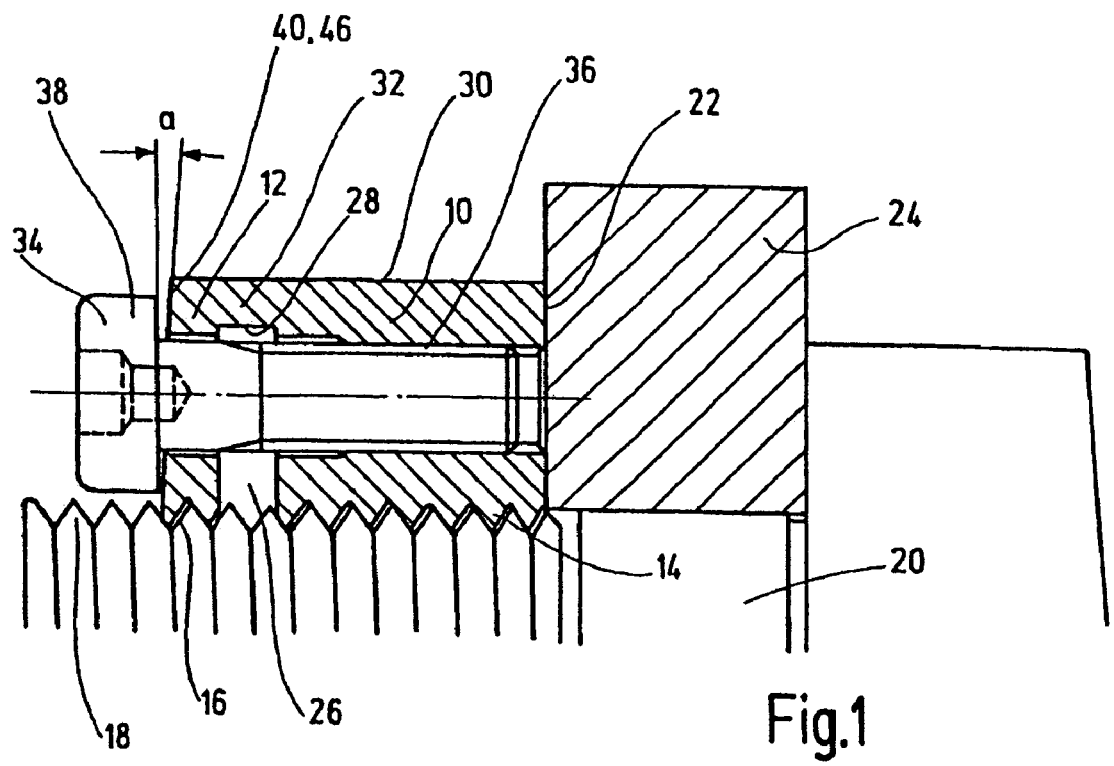
FIG. 1 is a partial, side elevational view in section of one-half side of a threaded ring according to a first exemplary embodiment of the present invention, on a threaded spindle, with the illustration being simplified for the sake of greater clarity of presentation of the principle of operation and in particular the threaded flank clearance being shown enlarged and the threaded ring being shown in the unlocked state, as it corresponds to the preinstallation or preinstalled state.

The threaded ring shown in the figures has two primary components, specifically a first body component 10 functioning as a set collar or adjusting nut and a second body component 12 forming a retaining ring. The two body components 10 and 12 are provided with continuous internal threading or threads 14, 16 respectively. In the illustrated embodiment, the internal threading 14 of the first body component 10 has more threads than the internal threading 16 of the second body component 12. With these internal threadings 14, 16, the threaded ring can be screwed onto a section of a spindle 20 provided with an external threading or thread 18. The body component 10 has an end plane surface 22 used for fixing in position a ring body 24 seated on the spindle 20 as a shaft collar.

Between the two body components 10 and 12, a gap 26 extends. In the installed state of the threaded ring, the gap extends in the radial direction from the external threading 18. The radially external end 28 of the gap 26 is spaced at a radial distance from the common circumference of the two body components 10, 12. The radially external end 28 of the gap 26 with the common circumference 30 borders a wall component 32 by which the first body component 10 and the second body component 12 are integrally joined to one another. The wall thickness of this wall component 32 is selected such that the wall component 32 forms a weak point or a flexible wall component. For a threaded ring produced from a steel material, wall component 32 permits flexible adjustment of the position of the second body component 12 relative to the first body component 10. The corresponding adjustment of the geometry of the gap 26 is then effected, the gap width being modified locally, for example.

Figure 2:
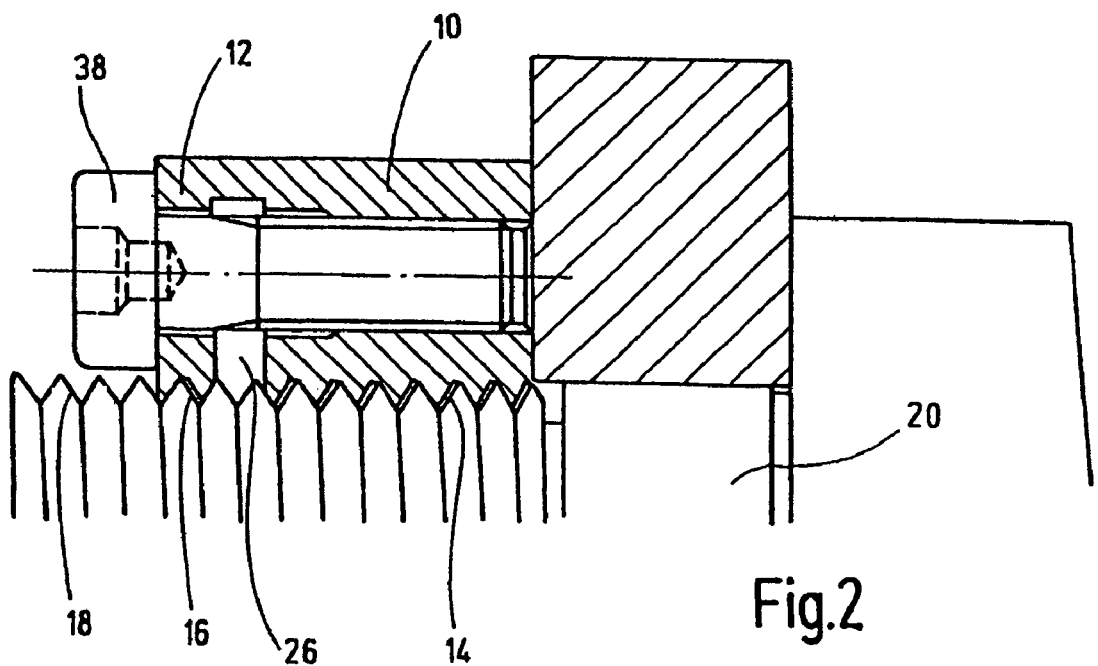
FIG. 2 is a partial, side elevational view in section of the threaded ring of FIG. 1, with the screw-on threaded ring being shown in the locked state, that is in the installation or installed state.

As the actuating mechanism for adjusting the geometry of the gap 26, individual set screws 34 are used as tensioning means, penetrate the gap 26 parallel with the axis, fit into the threaded bores 36 of the first body component 10, and are supported with their screw heads 38 at the end on the second body component 12 in the installed state (compare FIG. 2). The set screws 34 are uniformly distributed over a graduated circle concentric with the longitudinal axis of the threaded ring. Six set screws (not shown) are provided, for example. In this exemplary embodiment, the set screws 34 are configured as socket head cap screws with screw heads 38 which act on the free end face 40 of the threaded ring. Instead of the socket head cap screws illustrated, conventional hexagonal head screws can also be used cost-effectively, since in the illustrated embodiment shown in FIGS. 1 and 2 the radially tightening the set screws 34 is permitted from the outside, not coming from the front face.

Figure 3:
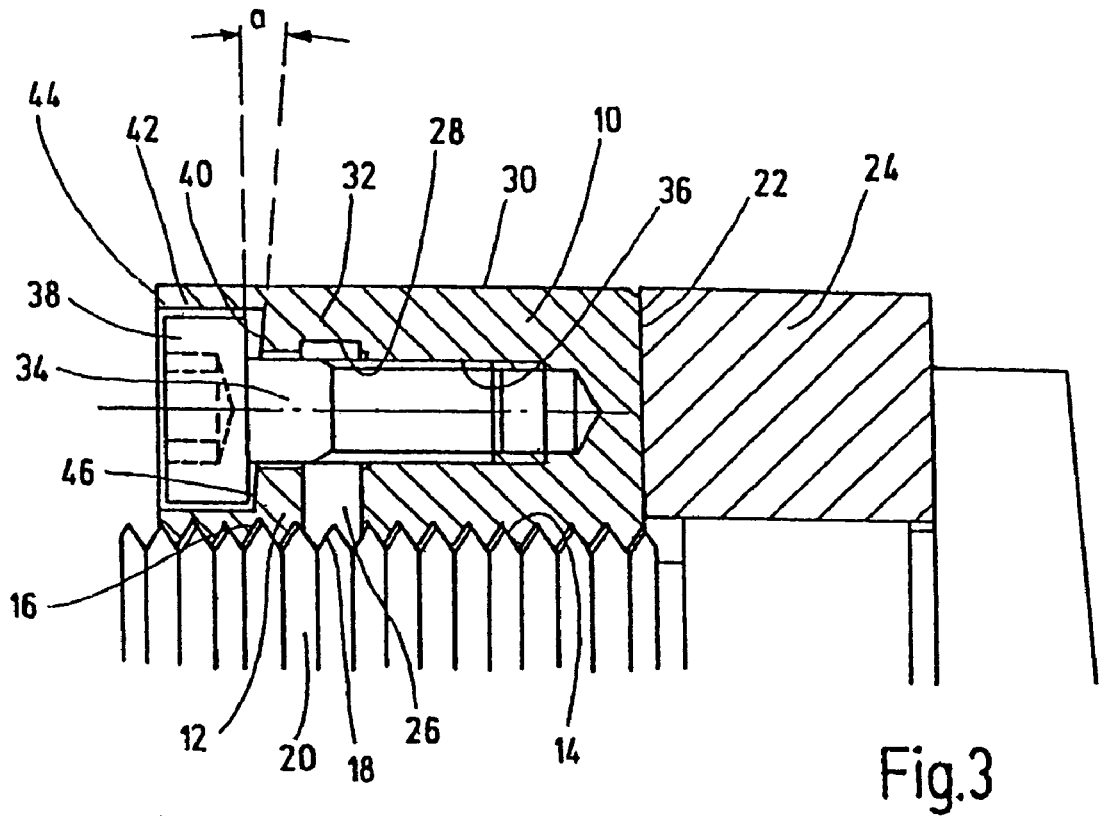
FIG. 3 is a partial, side elevational view in section of one side of a thread ring according to a second exemplary embodiment of the present invention, on a threaded spindle, with the illustration being simplified for the sake of greater clarity of presentation of the principle of operation and in particular the threaded flank clearance being shown enlarged and the threaded ring being shown in the unlocked state, as it corresponds to the preinstallation state.
Figure 4:
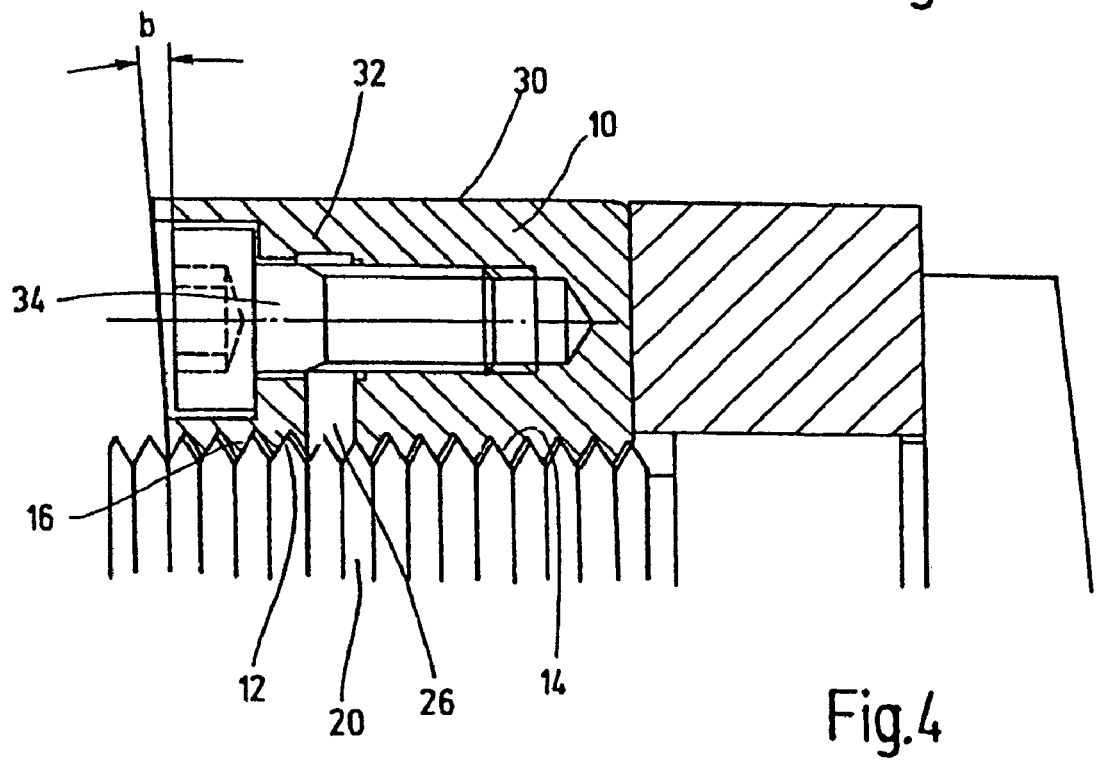
FIG. 4 is a partial, side elevational view in section of the threaded ring of FIG. 3, with the screw-on threaded ring being shown in the locked state, that is the installed state.
Figure 5:
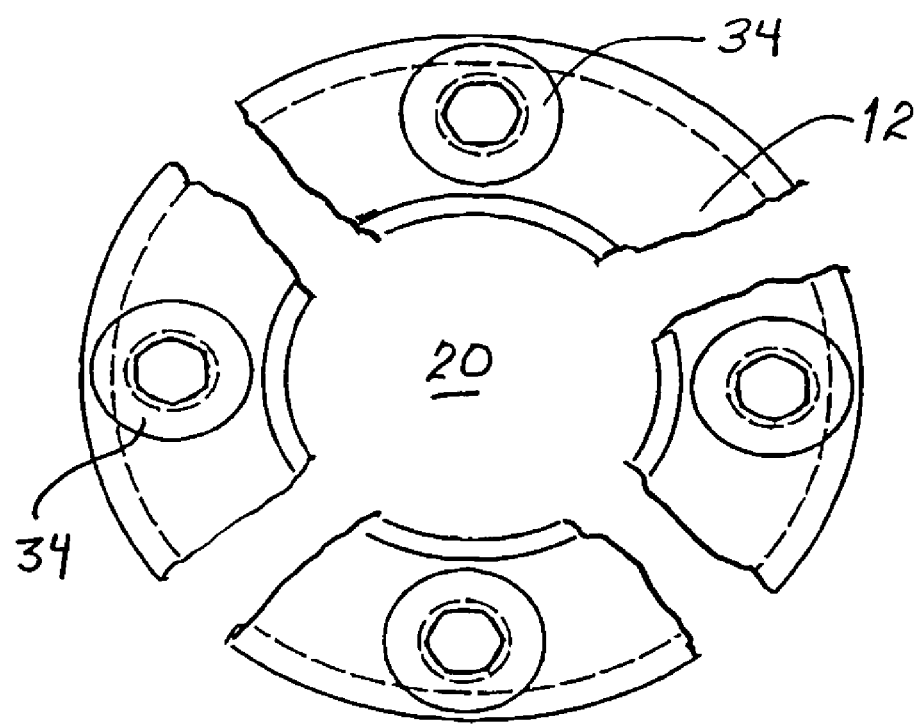
FIG. 5 is a partial, end elevational view of the thread ring of FIG. 1 showing plural screws.

In the second embodiment shown in FIGS. 3 and 4, conversely the screw heads 38 are held countersunk in the axially widening end segment of the pertinent through bore 42. In the preinstallation state, the screw heads 38 are essentially flush with the external end face 44 of the second body component 12. This widening end segment in the embodiment of FIGS. 3 and 4 is also accompanied by a lengthened internal threading segment relative to the internal threading 16 of the second body component 12. Otherwise, the two embodiments correspond to one another in terms of their function and action. The details stated in the foregoing with respect to the first embodiment also apply accordingly to the subject matter of the second exemplary embodiment, and for the second embodiment the same reference numbers are used for individual components corresponding to those in the first embodiment shown in FIGS. 1 and 2.

FIG. 1 shows the unlocked state, that is, the preinstallation state of the threaded ring. The existing threaded flank clearance of the thread engagement between the internal threadings 14 and 16, and external threadings 18 is shown enlarged for the sake of clarity. As shown, the flank surfaces of the internal threading 14, 16 are situated on the right side in the drawing are situated at a distance from the flank surfaces of the external threading 18 which are situated on the left side in the drawing.

FIG. 2 shows the locked state or the installation state, in which by actuating the actuating mechanism with the individual set screws 34 the second body component 12 is tensioned toward the first body component 10. For the second body component 12, the flank surfaces of the internal threading 16 are situated on the right side are then supported on the flank surfaces of the external threading 18. Conversely, for the first body component 10 the flank surfaces of the internal threading 14 situated on the left side are supported on the external threading 18. The threaded ring unit formed from the body components 10 and 12 tightened against each other, is then secured in its entirety.

The threaded ring of the present invention is designed to be rotationally symmetrical and has no grooves, slots, etc. generating unbalance. The set screws 34 distributed uniformly over a concentric graduated circle in conjunction with the flexible configuration of the wall component 32 yield uniform clamping forces on the threading. These clamping forces ensure intensive contact of the threaded flanks of the internal and external threadings 14, 16 and 18 and accordingly high axial stiffness of the threaded ring over the entire circumference. Any form defect adjustments and surface compressions which may be present may be evened out during installation by increased tensioning of the body components 10 and 12. The plane surface 22 of the first body component 10 used as a set collar or adjusting nut may be aligned by deliberate uniform tensioning of the set screws 34 until complete balance is achieved. If necessary, individual set screws 34 may be additionally tightened to compensate for tension on one side caused by the smallest errors of plane extension of the adjacent components.

In addition to the mutual positioning of gap 26 and the two body components 10, 12, the wall thickness of the elastically flexible wall component 32 is of importance to the configuration of the threaded ring of the present invention. Specifically, in the preinstallation state between the components of the actuating mechanism in the form of set screws 34 and components of the body of the threaded ring, a contact surface 46 is provided with a definable inclination a. The angle of inclination a is selected relative to the longitudinal axis of the body such that in the installation state the threaded flank clearance occurring is completely eliminated, as shown. This angle of inclination a for reliable use may assume values between one-half to five degrees, preferably between one to three degrees, depending on the equalization to be achieved for the threaded flank clearance and the accompanying thread pitch.

The contact surface 46 extending at an incline in the preinstallation state and forming the head support surface for the screw heads 38 of the set screws 34 is always dimensioned such that the contact surface 46 for the respective screw head 38, after locking the screw connection is set at a right angle, at the earliest at the maximum possible threaded flank clearance of the screw connection (compare installation state shown in FIG. 2). For the embodiments shown, most of the tensioning force generated by the set screws 34 acts near the external spindle thread 18 to be clamped so that the efficiency, compared to the conventional threaded ring designs, is therefore significantly improved. Based on the improved efficiency during clamping and securing of the threaded ring on the spindle 20, the threaded ring of the present invention can be deployed both in the axial and in the radial direction with very small dimensions. Furthermore, the improved efficiency also allows the new threaded ring to be designed with fewer set screws 34.

In the second embodiment shown in FIGS. 3 and 4, as an additional distinctive feature, when the screw heads 38 are integrated into the through bores 42 in the installed state, they form a clamping angle b relative to the external end face 44 of the retaining ring 12. Clamping angle b corresponds to the angle of inclination a in the preinstallation state, and allows visual monitoring of the locking. If the respective hexagonal head screw with its screw head 38 is axially integrated in the respective recess in the retaining ring 12, the use of socket head cap screws shown in FIGS. 3 and 4 is recommended, with the possibility of effecting clamping or loosening of the threaded ring by suitable tools from the axial longitudinal front side. In the embodiment shown in FIGS. 1 and 2 conversely, the hexagonal head screw one is preferably used with a screw head 38 having the hexagon on the outer circumferential side. In this way, it is possible to effect the described clamping and loosening processes from the circumferential side of the threaded ring, that is, radially.

While various embodiments have been chosen to illustrate the invention, it will be understood by those skilled in the art that various changes and modifications can be made therein without departing from the scope of the invention as defined in the appended claims.

What is claimed is:

1. A threaded ring for threadedly engaging an externally threaded section of a spindle, comprising:

a one-piece body having first and second body components relatively movable between a preinstallation state and an installation state and having a longitudinal axis, each of said body components having an internal thread forming a threaded flank clearance in the preinstallation state, said first body component forming a set collar with a planar surface on one end thereof extending in a radial plane relative to said longitudinal axis, said second body component forming a retaining ring connected to said first body component and having a contact surface extending non-perpendicularly relative to said longitudinal axis and at an angle of inclination from a plane perpendicular to said longitudinal axis in the preinstallation state, said threaded flank clearance being eliminated in the installation state;

a gap between said body components;

an elastically flexible wall component of said body connecting said body components; and an actuator engaging said contact surface to adjust geometry of said gap by adjustment of said flexible wall along said longitudinal axis and by movement of said body components between said states, said actuator including a set screw having a threaded shank extending parallel to said longitudinal axis and a screw head with a head surface facing said contact surface extending perpendicular to said longitudinal axis and at said angle of inclination to said contact surface in the preinstallation state.
2. A threaded ring according to claim 1 wherein said contact surface extends perpendicular to said longitudinal axis in the installation state.
3. A threaded ring according to claim 1 wherein said actuator comprises set screws permitting modification of widths of said gap at selected points.
4. A threaded ring according to claim 3 wherein said contact surface is situated between said set screws and said second body component.
5. A threaded ring according to claim 3 wherein a part of said contact surface is assigned to each of said set screws.
6. A threaded ring according to claim 3 wherein said second body component comprises recesses receiving said set screws.
7. A threaded ring according to claim 3 wherein said set screws are uniformly distributed over a circle coaxial to said longitudinal axis, said set screws penetrating said gap parallel to said longitudinal axis, and having screw heads supported on said contact surface in the installation state.
8. A threaded ring according to claim 7 wherein said set screws are hexagonal head screws countersunk in recesses in said second body component in the installation state and having screw heads oriented at a clamping angle relative an external front face of said second body component, said clamping angle corresponding to said angle of inclination in the preinstallation state.
9. A threaded ring according to claim 1 wherein said first and second body components have equal outside diameters.
10. A threaded ring according to claim 1 wherein said angle of inclination is one-half to five degrees.
11. A threaded ring according to claim 10 wherein said angle of inclination is one to three degrees.
12. A threaded ring according to claim 1 wherein said head surface and said contact surface are angularly oriented at an angle less than said angle of inclination in the installation state.
13. A threaded ring according to claim 1 wherein said angle of inclination is an acute angle.
14. A threaded ring according to claim 1 wherein said contact surface is planar.

* * * * *

UNITED STATES PATENT AND TRADEMARK OFFICE
CERTIFICATE OF CORRECTION

PATENT NO.       : 7,600,958 B2
APPLICATION NO.  : 10/562159
DATED            : October 13, 2009
INVENTOR(S)      : Heinz Metzger It is certified that error appears in the above-identified patent and that said Letters Patent is hereby corrected as shown below:

On the title page:

(73) Assignee: "Speith-Maschinenelemente GmbH & Co. KG" should read
--(73) Assignee: Spieth-Maschinenelemente GmbH & Co. KG--

Signed and Sealed this

Sixteenth Day of March, 2010

David J. Kappos
*Director of the United States Patent and Trademark Office*